United States Patent
Zhou et al.

(10) Patent No.: US 8,422,992 B2
(45) Date of Patent: Apr. 16, 2013

(54) MOBILE TERMINAL CAPABLE OF BEING TRACKED AND LOCATED AND METHOD FOR TRACKING AND LOCATING

(75) Inventors: Xinjun Zhou, Guangdong Province (CN); Cuirong Huang, Guangdong Province (CN); Wei Wang, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 55 days.

(21) Appl. No.: 13/258,414

(22) PCT Filed: Apr. 6, 2010

(86) PCT No.: PCT/CN2010/071573
§ 371 (c)(1),
(2), (4) Date: Sep. 21, 2011

(87) PCT Pub. No.: WO2010/127581
PCT Pub. Date: Nov. 11, 2010

(65) Prior Publication Data
US 2012/0040640 A1    Feb. 16, 2012

(30) Foreign Application Priority Data
May 4, 2009 (CN) .......................... 2009 1 0137656

(51) Int. Cl.
*H04M 1/66* (2006.01)
(52) U.S. Cl.
USPC ............... 455/410; 455/456.1; 455/404.2; 455/414.1; 455/432.3; 455/466
(58) Field of Classification Search .......... 455/410, 455/456.1, 404.2, 414.1, 432.3, 466
See application file for complete search history.

(56) References Cited

U.S. PATENT DOCUMENTS 7,123,141 B2 * 10/2006 Contestabile ............ 340/539.13
8,374,599 B2 *  2/2013 Tatman et al. ............... 455/425

FOREIGN PATENT DOCUMENTS

| CN | 101098536 A | 1/2008 |
| CN | 101247607 A | 8/2008 |
| CN | 101552966 A | 10/2009 |

OTHER PUBLICATIONS

International Search Report for PCT/CN2010/071573 dated Jul. 6, 2010.

* cited by examiner

*Primary Examiner* — Nghi H Ly
(74) *Attorney, Agent, or Firm* — Ling Wu; Stephen Yang; Ling and Yang Intellectual Property LLC (57) ABSTRACT

A mobile terminal capable of being tracked and located is disclosed, comprising a built-in card and a security system module which are connected with each other. The security system module generates a short message used for tracking and locating when receiving an incoming call request or a short message sent by the built-in card, wherein the short message at least carries an identification of a cellular tower interacting with the built-in card and information of current signal intensity, and the short message is sent into the built-in card; the built-in card sends the received incoming call request or the short message to the security system module and periodically sends the short message used for tracking and locating generated by the security system module to the set security number. A corresponding method is also provided. The security system is good at cover-up to bring the advantages of security and saving electricity.

30 Claims, 7 Drawing Sheets

MOBILE TERMINAL CAPABLE OF BEING TRACKED AND LOCATED AND METHOD FOR TRACKING AND LOCATING

TECHNICAL FIELD

The present invention relates to the field of mobile handheld electronic communication devices, and more particularly, to a mobile terminal capable of being tracked and located and a method for tracking and locating.

BACKGROUND OF THE RELATED ART

Due to higher and higher price and more and more powerful functions of handheld mobile terminals, it is more and more rampant that some criminals sell the robbed handheld mobile terminals to reap illegal benefits, which cause tremendous economic loss and a lot of inconveniences to the users.

Aimed at this kind of illegal behaviors, some mobile communication devices (right now they are mainly mobile phone products) take the lead in trying some methods to limit the normal use of the robbed devices in order to prevent this kind of illegal behaviors, however, user losses cannot be recovered and these methods are very passive. Moreover, these methods can be invalid by means that: the battery is removed, the communication media is broken (such as the subscriber identity module (SIM) card is removed), and the anti-theft software is erased (the mobile phone system is reloaded and reinstalled, or the function of network lock is disabled).

CONTENT OF THE INVENTION

The present invention provides a mobile terminal capable for being tracked and located and a method for tracking and locating, so as to make the mobile terminal still can be tracked and located even if the mobile terminal is illegally broken or the SIM card is removed.

In order to solve the above problem, the present invention discloses a mobile terminal capable for being tracked and located, and the mobile terminal comprises a built-in card and a security system module which are connected with each other, wherein, said security system module is configured to: when receiving an incoming call request or a short message sent from said built-in card, generate a short message used for tracking and locating, wherein the short message used for tracking and locating at least carries an identification of a cellular tower interacting with said built-in card and an information of current signal intensity, and send the short message used for tracking and locating to said built-in card; and said built-in card is configured to: send the received incoming call request or the received short message to said security system module, and periodically send the short message used for tracking and locating and generated by said security system module to a set security number.

In the above-mentioned mobile terminal, said short message used for tracking and locating further carries a registration information of a current SIM card and a position tracking information.

In the above-mentioned mobile terminal, said security system module is further configured to: automatically accept the incoming call request sent from said built-in card, prompt an opposite party by voice additional operations that can be selected, and perform the corresponding additional operation according to a selection of the opposite party.

Wherein, said security system module is further configured to: after prompting the opposite party by voice the additional operations that can be selected, if a dual tone multi frequency (DTMF) signal is detected, analyze the DTMF signal to acquire the additional operation selected by the opposite party.

In the above-mentioned mobile terminal, said security system module is further configured to: judge and analyze whether the received short message sent from the built-in card carries an additional operation conforming to a set format, and perform the additional operation carried in the short message.

Wherein, said additional operations comprise one or more of:

modifying the security number, configuring a time interval for taking back a current tracking information, configuring information in the short message which is took back, whether the security system module needs to calculate the tracking information, and whether defaulted taking back all information.

Said security system module is further configured to: judge whether a SIM card number of the mobile terminal is consistent with the set security number, and if the SIM card number is not consistent with the set security number, generate the short message used for tracking and locating and send to said built-in card.

Said security system module is further configured to: periodically check whether the SIM card in said mobile terminal is in a normal state, and if the SIM card is not in the normal state, generate the short message used for tracking and locating and send to said built-in card.

The above-mentioned mobile terminal further comprises a standby battery connecting with said security system module, and said standby battery is configured to: supply said security system module with power when said mobile terminal is powered off, so that the security system module can work normally.

Said security system module is implemented with a hardware circuit.

The present invention also discloses a mobile terminal capable of being tracked and located, and the mobile terminal comprises a built-in card and a security system module which are connected with each other, wherein, said built-in card is configured to: periodically send a short message generated by said security system module to a set security number; and said security system module is configured to: judge whether an SIM card number of the mobile terminal is consistent with the set security number, and if the SIM card number is not consistent with the security number, generate the short message used for tracking and locating, wherein said short message used for tracking and locating at least carries an identification of a cellular tower interacting with said built-in card and an information of current signal intensity, and send the short message used for tracking and locating to said built-in card.

In the above-mentioned mobile terminal, said security system module is configured to: if determining that said SIM card number is consistent with said security number, monitor an incoming call request related to said built-in card, monitor a short message related to said built-in card, generate the short message used for tracking and locating when the incoming call request or the short message is monitored, and send said short message used for tracking and locating to the built-in card.

In the above-mentioned mobile terminal, said security system module is further configured to: periodically check whether the SIM card in the mobile terminal is in a normal state, and if the SIM card is not in the normal state, generate the short message used for tracking and locating and send to said built-in card.

Wherein, said short message used for tracking and locating further carries a registration information of the current SIM card and a position tracking information.

The present invention also discloses a method for tracking and locating, and the method comprises: after a mobile terminal capable of being tracked and located starts up a security system, if the mobile terminal receives an incoming call request or a short message, the mobile terminal periodically sending a short message used for tracking and locating to a set security number, wherein the short message used for tracking and locating at least carries an identification of a cellular tower interacting with said mobile terminal and an information of current signal intensity.

In the above-mentioned method, said short message used for tracking and locating further carries a registration information of a current SIM card and a position tracking information.

Wherein, the incoming call request or the short message received by the mobile terminal is related to a built-in card in the mobile terminal; and when said built-in card in the mobile terminal receives the incoming call request, the method further comprises: said mobile terminal automatically accepting the incoming call request, prompting an opposite party by voice additional operations that can be selected, and performing the corresponding additional operation according to a selection of the opposite party.

Before performing the corresponding additional operation according to a selection of the opposite party, the method further comprises: if a dual tone multi frequency (DTMF) signal is detected, analyzing said DTMF signal to acquire the additional operation selected by the opposite party.

When the built-in card in said mobile terminal receives the short message, before performing the corresponding additional operation according to the selection of the opposite party, the method further comprises: said mobile terminal judging and analyzing whether the short message carries an additional operation conforming to a set format.

Wherein, said additional operations comprise one or more of:

modifying the security number, configuring a time interval for taking back a current tracking information, configuring information in the short message which is took back, whether the security system module needs to calculate the tracking information, and whether defaulted taking back all information.

After said mobile terminal starts up the security system, if said mobile terminal determines that the SIM card number of the mobile terminal is not consistent with said security number, said mobile terminal also sends periodically said short message used for tracking and locating to said security number, wherein the short message used for tracking and locating at least carries the identification of a cellular tower interacting with said mobile terminal and the information of current signal intensity.

After said mobile terminal starts up the security system, said mobile terminal also periodically checks whether the SIM card in said mobile terminal is in a normal state, and if the SIM card is not in the normal state, said mobile terminal periodically sends the short message used for tracking and locating to said security number, wherein the short message used for tracking and locating at least carries the identification of a cellular tower interacting with said mobile terminal and the information of current signal intensity.

After said mobile terminal is powered off, it starts up a solar energy battery to supply said security system with power.

The present invention also discloses a method for tracking and locating, and the method comprises: after a mobile terminal capable of being tracked and located starts up a security system, if the mobile terminal determines that an SIM card number of the mobile terminal is not consistent with a set security number, the mobile terminal periodically sending a short message used for tracking and locating to said security number, wherein the short message used for tracking and locating at least carries an identification of a cellular tower interacting with said mobile terminal and an information of current signal intensity.

In the above-mentioned method, if the mobile terminal determines that the SIM card number of the mobile terminal is consistent with said security number, the mobile terminal periodically sends the short message used for tracking and locating to said security number when receiving an incoming call request or a short message.

In the above-mentioned method, after said mobile terminal starts up the security system, it periodically checks whether the SIM card in said mobile terminal is in a normal state, and if the SIM card is not in the normal state, said mobile terminal periodically sends the short message used for tracking and locating to said security number.

Wherein, said short message used for tracking and locating further carries a registration information of the current SIM card and a position tracking information.

Since the technical scheme of the present invention does not use functions such as display screen, key-press response, signal indicator light, audio frequency input and output and so on which might expose that the security system is running, it guarantees the concealment of the security system. Meanwhile, the technical scheme of the present invention also effectively solves the problem that the stolen mobile terminal cannot be tracked and located because the reasons of the battery being removed, the communication media being broken (a SIM card being replaced or removed) and the anti-theft software being erased (the cell phone system is reloaded and reinstalled).

PREFERRED EMBODIMENTS OF THE PRESENT INVENTION

The technical scheme of the present invention will be illustrated in more detail below with combination of the accompanying figures and embodiments.

The First Embodiment

Figure 1A:
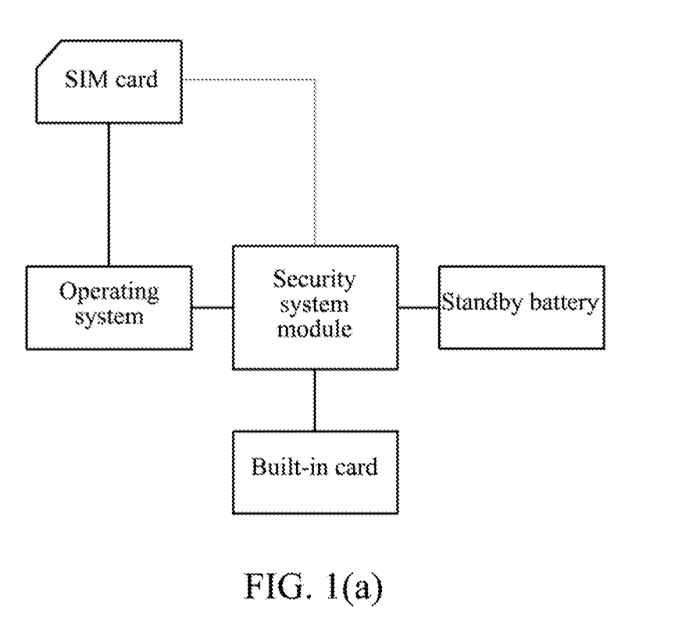
FIG. 1(a) is a schematic diagram of a structure of a mobile terminal according to the first embodiment of the present invention.
Figure 1B:
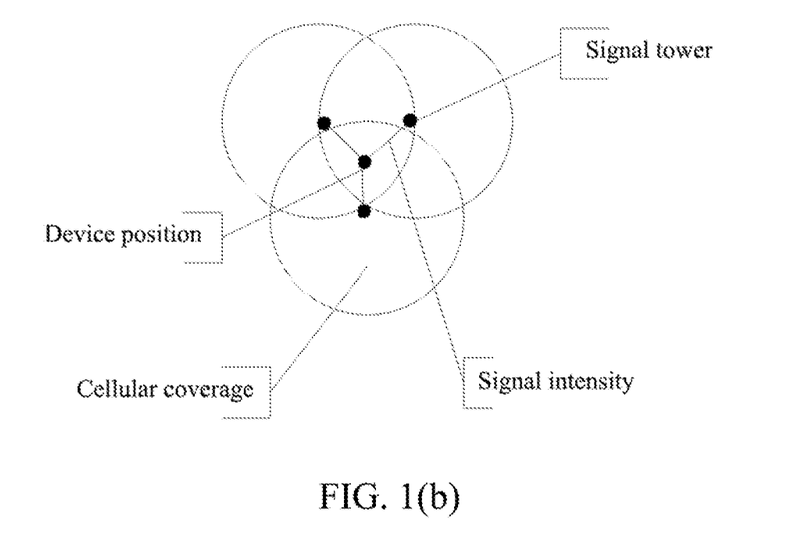
FIG. 1(b) is a schematic diagram of a principle of locating the mobile terminal shown in FIG. 1(a) by a cellular signal tower.

A mobile terminal capable of being tracked and located, is added with the function of being tracked and located on the basis of the existing mobile terminal including a SIM card and an operating system, and as shown in FIG. 1, the structure of the mobile terminal comprises a security system module which connects with both the operating system and the SIM card, and a standby battery and a built-in card, both of which connect respectively with the security system module. The function of each component will be introduced in the following.

The built-in card is used to send the received incoming call request or short message to the security system module, and periodically send to a set security number a short message used for tracking and locating and generated by the security system module;

wherein, the built-in card is implemented by solidifying a device or a circuit similar to the SIM card into a single board, and the mobile terminal can be tracked and located by the solidified built-in card which is similar to the SIM card.

The security system module is used to monitor incoming calls related to the built-in card, monitor short messages related to the built-in card, interact with the SIM card, acquire information of a cellular signal tower, and generate a short message used for tracking and locating when receiving the incoming call request or the short message related to the built-in card, wherein the short message used for tracking and locating at least carries an identification of the cellular tower interacting with the built-in card and an information of the current signal intensity, and can further carries a registration information of the current SIM card and a position tracking information, and so on, wherein the position tracking information is calculated out by the security system module according to the identification of the cellular tower interacting with the built-in card and the information of the current signal intensity;

in the present invention, the security system module does not use functions such as display screen, press-key response, signal indicator light, audio input and output, and so on, which might expose that the security system module is running, that is, when the security system monitors the incoming call or the short message related to the built-in card, it does not prompt the user of the mobile terminal, only processes at the background. Meanwhile, the security system module can work together with the operating system to monitor and operate the SIM card; and in order to guarantee the security of the security system module, there is only an security interface reserved between the security system module and the operating system, the security system module has an authority of individually operating the standby battery and the built-in card, and the operating system does not directly connect with the built-in card and the standby battery;

specifically, for the security system module, after the user activates the security system module by a special command, the security system module labels on the built-in card that a security system is activated, and records the current SIM number as the security number; and when the security system module enters into the security system and receives an additional operation initialized by the user, the security system module can also modify the security number, configure time interval for taking back the current tracking information, configure the information in the short message which is took back (i.e., the short message used for tracking and locating), calculate the tracking information, or defaulted take back all information, and so on, according to the additional operation selected by the user.

In the preferred embodiment, the security system module is also used to further judge whether the SIM card number of the mobile terminal is consistent with the recorded security number during the procedure of the mobile terminal being powered on, if the SIM card number is consistent with the recorded security number, the security system module performs the above-mentioned operations, such as monitoring incoming calls related to the built-in card, monitoring short messages related to the built-in card, interacting with the SIM card, acquiring the information of the cellular signal tower, and so on, and if the SIM card number is not consistent with the recorded security number (the SIM card in the mobile terminal cannot be detected, that is, there may be no SIM card in the mobile terminal, which is also considered that the SIM card number of the mobile terminal is not consistent with the recorded security number), then while the security system module performs the above-mentioned operations, it actively generates the short message used for tracking and locating and periodically sends the short message used for tracking and locating to the recorded security number via the built-in card;

in some embodiments, the security system module can also further periodically (for example, every another day) check whether the SIM card is in a normal state; once the SIM card is discovered that the state of that is an abnormal state such as out of service or number cancelled, the built-in card in the mobile terminal periodically sends the short message used for tracking and locating to the security number recorded in the mobile terminal according to the set time.

The standby battery is used to supply power for the normal working of the security system module when the mobile terminal is powered off, so as to guarantee the function that the mobile terminal is capable of being tracked and located can normally work for a longer time. In the present embodiment, a solar energy battery is used as the standby battery.

The user can power on or off the security system module via the security interface reserved in the operating system of the above mobile terminal. When the security system module is powered on, it enters into a on call state; and once the security system module receives an incoming call or a short message related to the built-in card, it sends the information related to the cellular signal tower and the calculated current position to an external specified target by interacting with the cellular signal tower. In the process, the user can also reconfigure the security system module by a special formatted command (that is, the additional operation).

Figure 2:
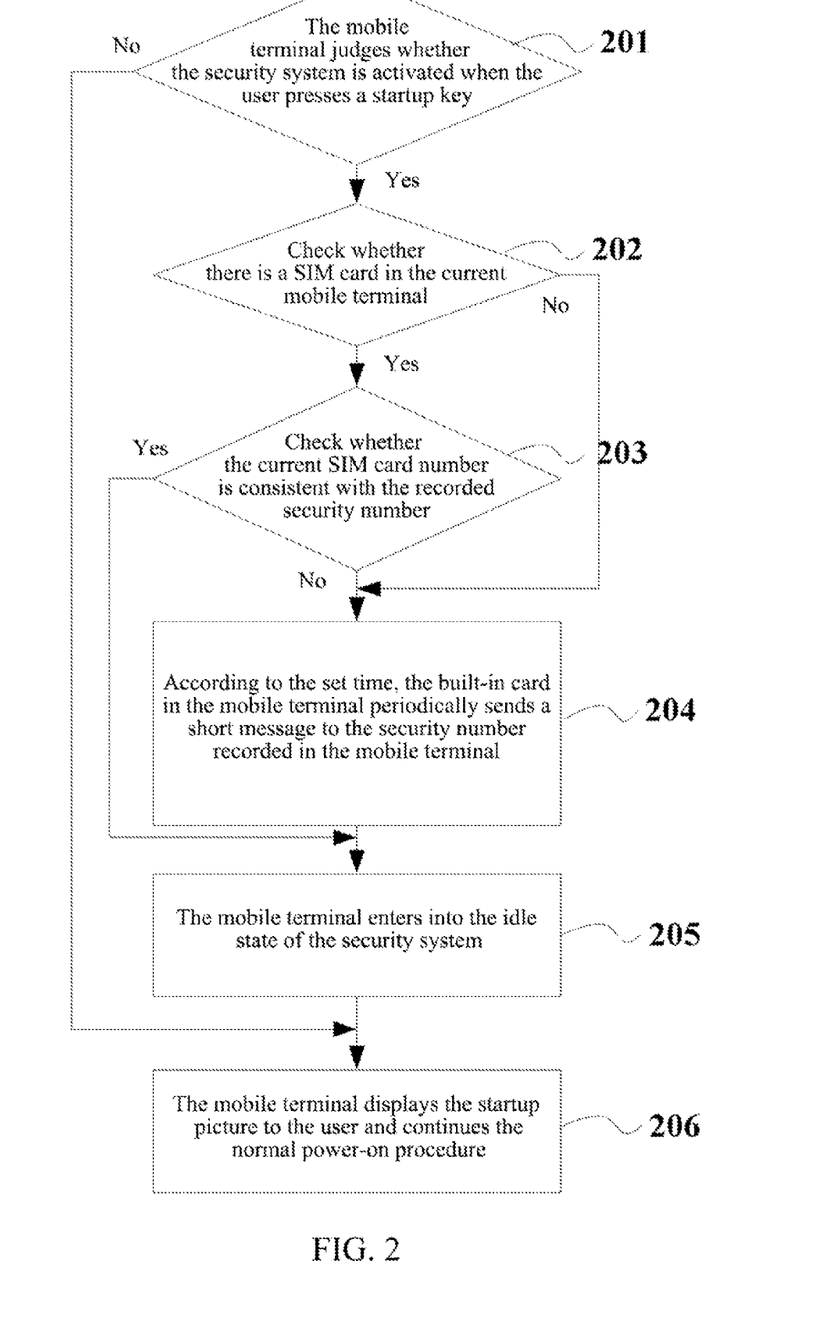
FIG. 2 is a flow chart of the mobile terminal being powered on according to the first embodiment.

The procedure of the mobile terminal being powered on will be illustrated in detail in the following, as shown in FIG. 2, comprising the following steps:

step 201, when the user presses a startup key, the mobile terminal judges whether the security system is activated, and if yes, proceed to step 202, otherwise, proceed to step 206;

step 202, check whether there is a SIM card in the current mobile terminal, and if yes, proceed to step 203, otherwise, proceed to step 204;

step 203, check whether the current SIM card number is consistent with the recorded security number, and if yes, proceed to step 205, otherwise, proceed to step 204;

in other embodiments, steps 202 and 203 can be combined into one step operation, that is, it only needs to judge whether the SIM number of the mobile terminal is consistent with the recorded security number, and in the meantime, if the mobile terminal cannot detect the SIM card or there is no SIM card in the mobile terminal, it determines that the SIM card number of the mobile terminal is not consistent with the recorded security number;

step 204, the built-in card in the mobile terminal periodically sends a short message used for tracking and locating to the security number recorded in the mobile terminal according to the set time, wherein the short message at least carries the identification of the cellular tower interacting with the built-in card and the information of the signal intensity;

in the preferred embodiment, the short message used for tracking and locating also carries the registration information of the current SIM card and the position tracking information, and so on, wherein the position tracking information is calculated out by the security system module according to the identification of the cellular tower interacting with the built-in card and the information of the current signal intensity;

step 205, the mobile terminal enters into the idle state of the security system;

step 206, the mobile terminal displays a startup picture to the users, and continues the normal power-on procedure.

Considering real time effect of the security system in the mobile terminal, and in order to guarantee the procedure of the security system is not modified, in the preferred embodiment, therefore, a hardware circuit is adopted to implement the security system. It is because a advantage of adopting the hardware circuit to implement is that the procedure flows along with a direction of the electric circuit and cannot be easily modified.

In the preferred embodiment, after the mobile terminal enters into the idle state of the security system, it periodically (such as, every other day) checks whether the SIM card is in a normal state; once it discovers that the state of the SIM card is a non-normal state such as out of service or number cancelled, the built-in card in the mobile terminal periodically sends the short message used for tracking and locating to the security number recorded in the mobile terminal according to the set time.

Figure 3:
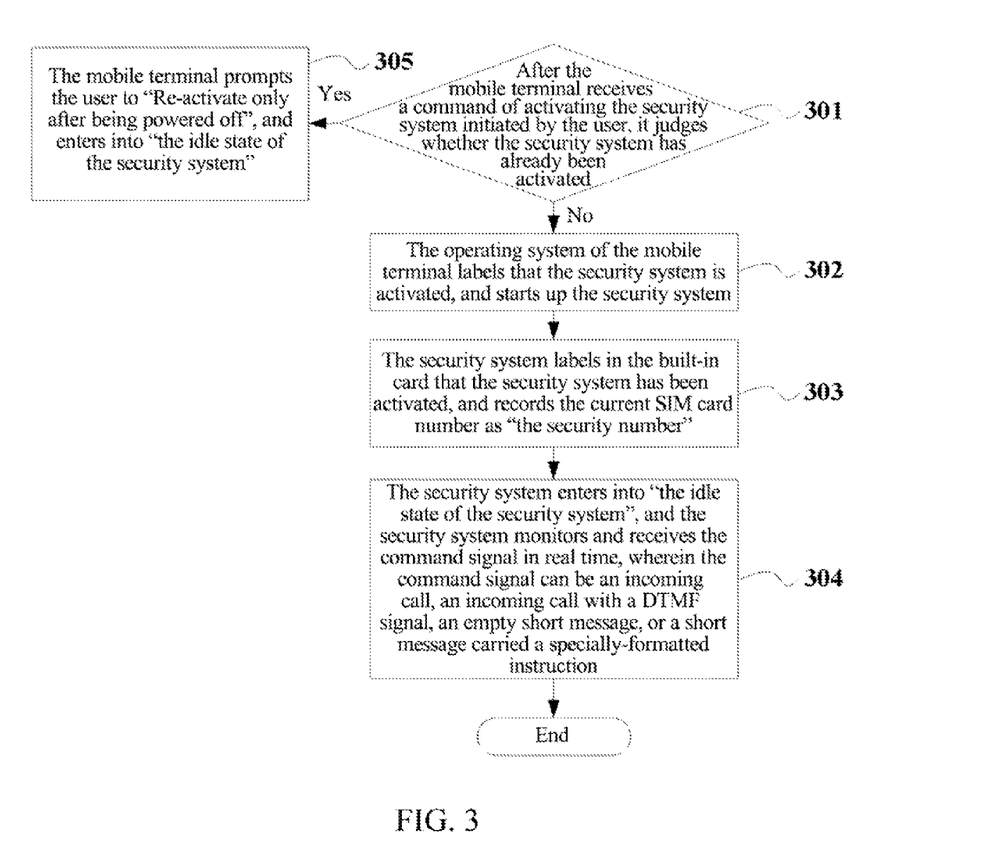
FIG. 3 is a flow chart of the mobile terminal activating a security system according to the first embodiment.

The procedure of activating the security system (i.e., starting up the security system module) is shown in FIG. 3, and the procedure comprises the following steps:

step 301, after the mobile terminal receives a command of activating the security system initiated by the user, it judges whether the security system has already been activated, and if yes, proceed to step 305, otherwise, proceed to step 302;

in the step, the user can activate the security system by a security interface which is inputted a special command (such as, *#xxx#) in the Idle state of the mobile terminal, and the user can also activate the security system by pressing combined keys at the same time, for example, the startup key+ number key "1" or the startup key+symbol key "#"+number key "0" can be used as the form of "the combined key to activate the security system"; wherein, the special command can be a seal key provided together with a package when the user purchases the mobile terminal product, which takes the fact that the package is not carried around into account, thus significantly reducing the possibility that the key is acquired by somebody else;

step 302, the operating system of the mobile terminal labels that the security system is activated, and starts up the security system;

in this step, after the operating system starts up the security system, the security system and the operating system work individually;

step 303, the security system labels in the built-in card that the security system has been activated, and records the current SIM card number as "the security number";

step 304, the security system enters into "the idle state of the security system", and the security system monitors and receives the command signal in real time, wherein, the command signal can be an incoming call, an incoming call with a DTMF signal, an empty short message, or a short message carried a specially formatted instruction; and the present procedure ends.

Step 305, the mobile terminal prompts the user to "Re-activate only after being powered off", and enters into "the idle state of the security system".

Figure 4:
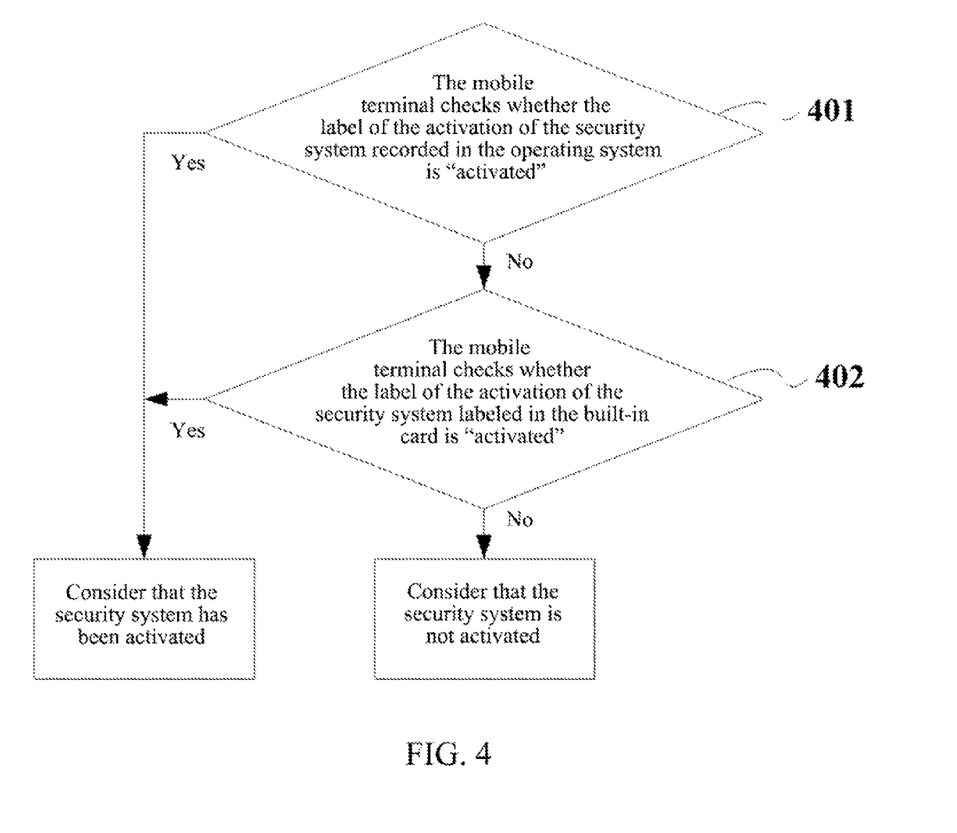
FIG. 4 is a flow chart of the mobile terminal judging whether a security system is activated according to the first embodiment.

The procedure of the mobile terminal judging whether the security system is activated is shown as FIG. 4, and the procedure specifically comprises the following steps:

step 401, the mobile terminal checks whether the label of the activation of the security system recorded in the operating system is "activated", and if yes, consider that the security system has been activated, otherwise, proceed to step 402;

step 402, the mobile terminal checks whether the label of the activation of the security system labeled in the built-in card is "activated", and if yes, consider that the security system has been activated, otherwise, consider that the security system is not activated.

Of course in other embodiments, in order to prevent, for example, since the data in the operating system is maliciously modified, the label indicating that the security system module has been activated from losing, or to prevent, due to some errors, the label recorded in the built-in card and indicating that the security system module has been activated from losing, as long as the mobile terminal discovers a condition meeting step 401 or 402, it considers that the security system has been activated, which means that activating the security system is easier and more convenient, thus improving the reliability of the security system.

Figure 5:
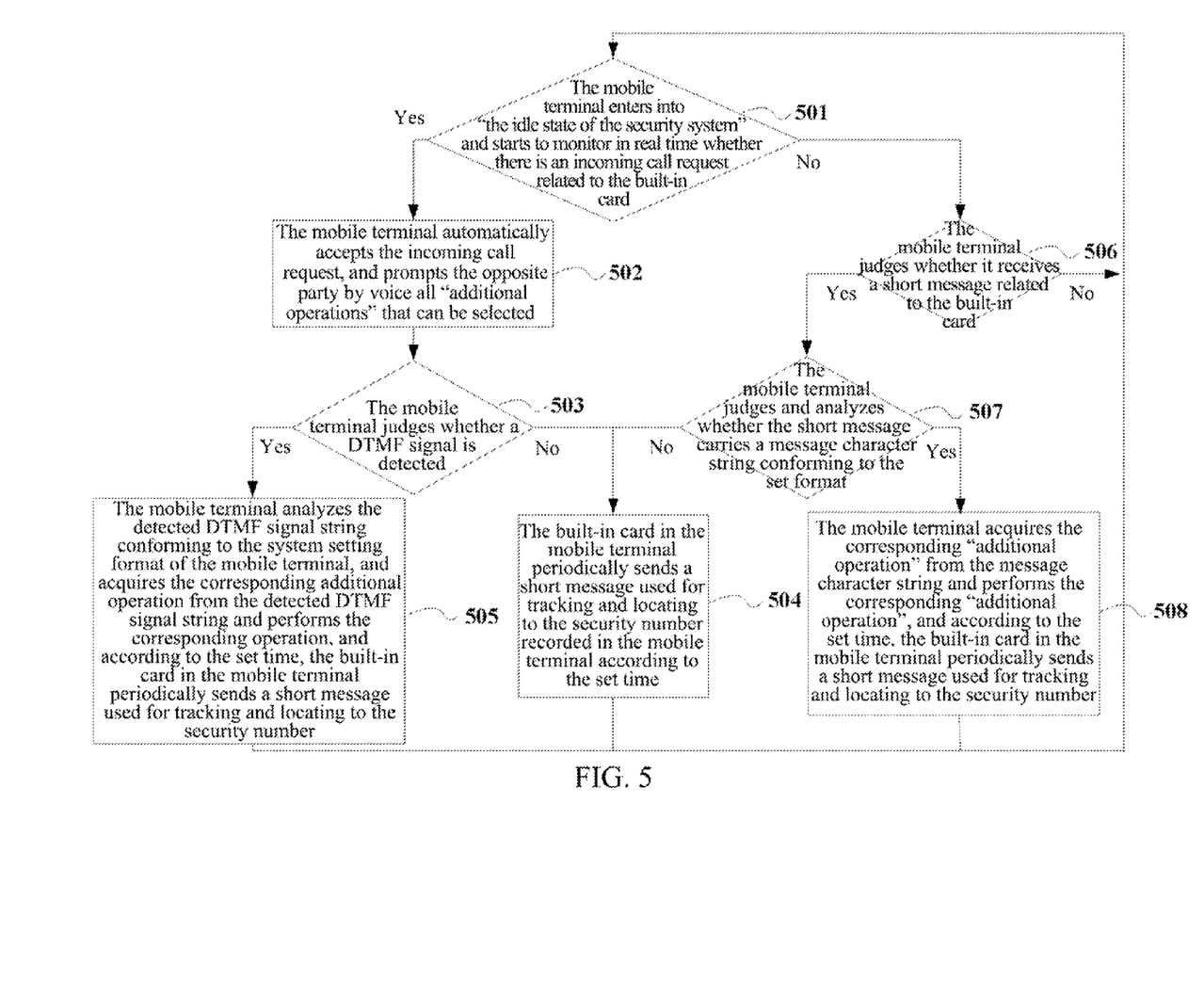
FIG. 5 is a flow chart of the mobile terminal entering into an idle state of a security system according to the first embodiment.

The procedure of the mobile terminal entering into "the idle state of the security system", as shown in FIG. 5, comprises the following steps:

step 501, the mobile terminal enters into "the idle state of the security system" and starts to monitor in real time whether there is an incoming call request related to the built-in card, and if yes, proceed to step 502, otherwise, proceed to step 506;

step 502, the mobile terminal automatically accepts the incoming call request, and prompts the opposite party by voice all "additional operations" that can be selected;

in this step, the additional operations comprise: modifying the security number, configuring time interval for taking back the current tracking information, configuring information in the short message which is took back, whether it needs to calculate the tracking information and whether defaulted taking back all information, and so on;

in the present embodiment, when the mobile terminal accepts the incoming call request, it does not use functions such as display screen, key-press response, signal indicator light, audio frequency input and output, and so on, which might expose that the security system is running, that is, the mobile terminal does not make any prompt to the user of the mobile terminal, only processes at the background;

step 503, the mobile terminal judges whether a DTMF signal is detected, and if yes, proceed to step 505, otherwise, proceed to step 504;

in this step, if the user selects one or more additional operations by voice prompting, the mobile terminal determines that it detects the DTMF signal, and if the user does not select any additional operation, the mobile terminal determines that it does not detect the DTMF signal;

step 504, the built-in card in the mobile terminal periodically sends a short message used for tracking and locating to the security number recorded in the mobile terminal according to the set time defaulted by the system, wherein the short message at least carries the identification of the cellular tower interacting with the built-in card and the information of the signal intensity, and return to step 501;

in the preferred embodiment, the short message used for tracking and locating also carries the registration information of the current SIM card and the position tracking information, and so on;

step 505, the mobile terminal analyzes the detected DTMF signal string conforming to the system setting format of the mobile terminal, and acquires the corresponding additional operation from the detected DTMF signal string and performs the corresponding additional operation; according to the set time, the built-in card in the mobile terminal periodically sends a short message used for tracking and locating to the security number, wherein the short message at least carries the identification of the cellular tower interacting with the built-in card and the information of the signal intensity; and return to step 501;

for example, the DTMF signal, detected by the mobile terminal, conforming to the system setting format of the mobile terminal is "12345678910#1#98765432110#98765432110", then the correspondingly performed "additional operation" is modifying the current security number to 98765432110; the short message used for tracking and locating might also carry the registration information of the current SIM card and the position tracking information, and so on;

step 506, the mobile terminal judges whether it receives a short message related to the built-in card, and if yes, proceed to step 507, otherwise, return to step 501;

in the present embodiment, when the mobile terminal receives the short message, it does not use functions such as display screen, key-press response, signal indicator light, audio frequency input and output and so on, which might expose that the security system is running, that is, the mobile terminal does not make any prompt to the user of the mobile terminal, only processes at the background;

step 507, the mobile terminal judges and analyzes whether the short message carries a message character string conforming to the system setting format of the mobile terminal, and if yes, proceed to step 508, otherwise, proceed to step 504;

step 508, the mobile terminal acquires the corresponding "additional operation" from the message character string and performs the corresponding "additional operation"; according to the set time, the built-in card in the mobile terminal periodically sends a short message used for tracking and locating to the security number, wherein the short message at least carries the identification of the cellular tower interacting with the built-in card and the information of the signal intensity; and return to step 501;

in the step, the mobile terminal analyzing whether the short message carries a special format command means that the mobile terminal analyzing whether the short message comprises a command including the current security number, the additional operation code and some separators, and the command is used to perform the additional operation; for example, when the content in the short message is "12345678910#1#98765432110#98765432110", it means providing the current security number "12345678910" of the security system as the "additional operation" authority identification, and only when the provided number string is consistent with the current security number, the subsequent operation will be performed, otherwise, it considers that the additional operation fails; in the present embodiment, the additional operation code "1" represents that the present additional operation is modifying the security number, and other additional operations can also be performed according to the different additional operation code; and two same strings "98765432110" indicate that the security number should be modified as 98765432110, which is to guarantee no input error and input the same numbers twice, and if the two strings are different, it considers that the additional operation fails, and proceed to step 504.

Figure 6:
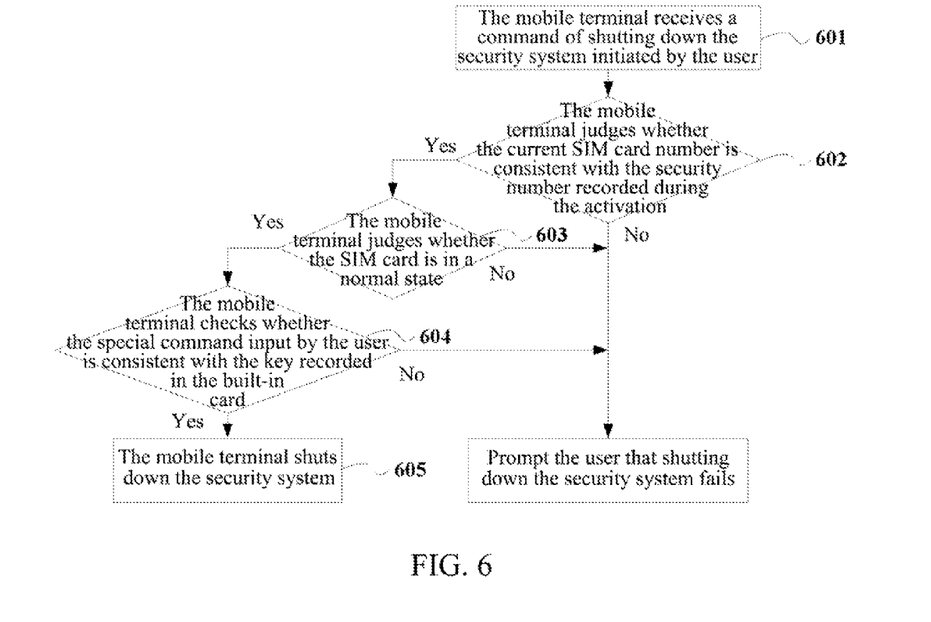
FIG. 6 is a flow chart of the mobile terminal powering off a security system according to the first embodiment.

In the following, the procedure of the above-mentioned mobile terminal shutting down the security system (also called deactivating, that is, shutting down the security system module) will be introduced. The procedure is the reverse procedure of the activation procedure shown in FIG. 3, and as shown in FIG. 6, the procedure specifically comprises the following steps:

step 601, the mobile terminal receives a command for shutting down (also called deactivating) the security system initiated by the user;

in the step, the user might input a special command to shut down the security system in the idle state of the mobile terminal, and in order to guarantee the security, in the present embodiment, the special command used to shut down the security system corresponds to the mobile terminal one-to-one, that is, the special command of each mobile terminal is unique;

step 602, the mobile terminal judges whether the current SIM card number is consistent with the security number recorded during the activation, and if yes, proceed to step 603, otherwise, prompt the user that shutting down the security system fails;

step 603, the mobile terminal judges whether the SIM card is in a normal state, and if yes, proceed to step 604, otherwise, prompt the use that shutting down the security system fails;

in this step, if the mobile terminal discovers abnormal conditions such as out of service or number cancelled, and so on, it considers that the SIM card is in abnormal state;

step 604, the mobile terminal checks whether the special command input by the user is consistent with the key recorded in the built-in card, and if yes, proceed to step 605, otherwise, prompt the user that shutting down the security system fails;

step 605, the mobile terminal shuts down the security system.

From the above-mentioned procedure of shutting down the security system, it needs four acknowledgements before shutting down the security system, and it is considered as a legal shutdown operation only when all the four steps are correct, thus guaranteeing the reliability of the security system.

Figure 7:
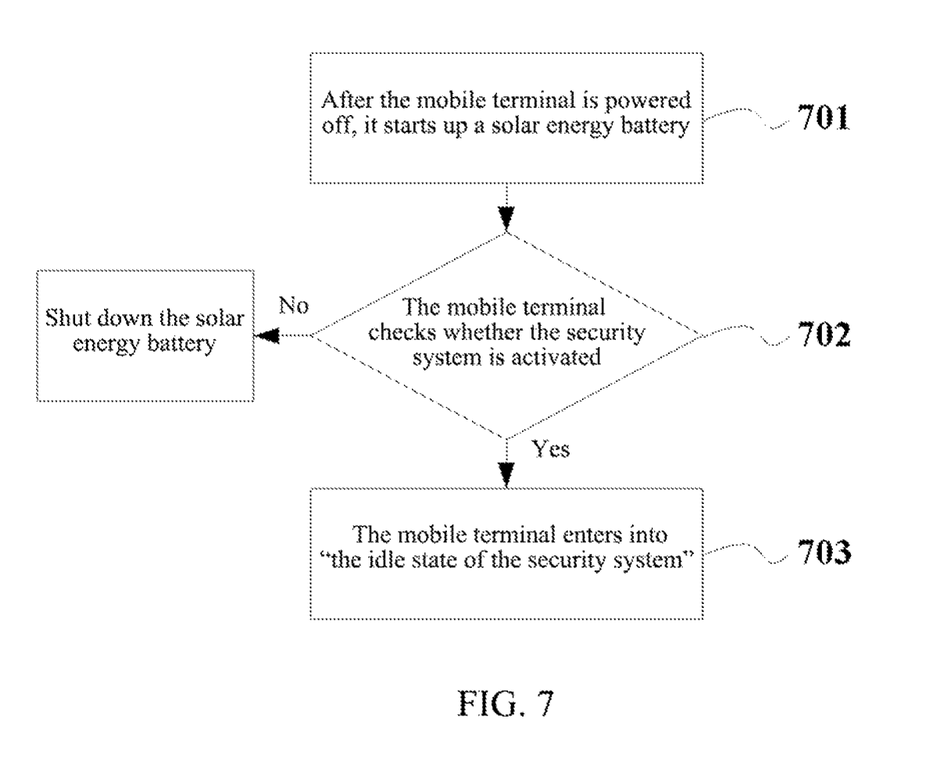
FIG. 7 is a flow chart of protecting a security system when the mobile terminal is interrupted power supply/powered off according to the first embodiment.

At last, the procedure of the above-mentioned mobile terminal being powered off normally or being powered off after interrupting power supply, as shown in FIG. 7, comprises the following steps:

step 701, after the mobile terminal is powered off, it starts up a solar energy battery;

step 702, the mobile terminal checks whether the security system is activated, and if yes, proceed to step 703, otherwise, shut down the solar energy battery;

step 703, the mobile terminal enters into "the idle state of the security system".

The Second Embodiment

The mobile terminal capable of being tracked and located in the present embodiment is the same as the first embodiment, and the difference between both of the embodiments is that the function of the security system module changes.

The security system module in the present embodiment is used to judge whether the SIM card number of the mobile terminal is consistent with the recorded security number, if the SIM card number is consistent with the recorded security number, the security system module performs all operations described in the first embodiment, such as monitoring the incoming calls related to the built-in card, monitoring the short messages related to the built-in card, interacting with the SIM card, acquiring the information of the cellular signal tower and generating the short message used for tracking and locating, and so on, and if the SIM card number is not consistent with the recorded security number (the SIM card in the mobile terminal cannot be detected, that is, there is no SIM card in the mobile terminal, which is also considered that the SIM card number of the mobile terminal is not consistent with the recorded security number), the security system module actively generates the short message used for tracking and locating and periodically sends the short message used for tracking and locating to the recorded security number via the built-in card.

The procedures of the above-mentioned mobile terminal activating the security system, judging whether the security system is activated, the idle state of the security system and protecting the security system during being interrupted power supply/powered off are the same as those in the first embodiment, but the difference between both of the embodiments is the procedure of powering on the above-mentioned mobile terminal which specifically comprises the following steps:

step A, when the user presses down the startup key, the mobile terminal judges whether the security system is activated, and if yes, proceed to step B, otherwise, proceed to step F;

step B, check whether there is a SIM card in the current mobile terminal, and if yes, proceed to step C, otherwise, proceed to step E;

step C, check whether the current SIM card number is consistent with the recorded security number, and if yes, proceed to step E, otherwise, proceed to step D;

in other embodiments, the above-mentioned steps B and C can be combined into one step operation, that is, it only need to judge whether the SIM number of the mobile terminal is consistent with the recorded security number, and at this time, if the mobile terminal cannot detect the SIM card, or there is no SIM card in the mobile terminal, it determines that the SIM card number of the mobile terminal is not consistent with the recorded security number.

Step D, the built-in card in the mobile terminal periodically sends a short message used for tracking and locating to the security number recorded in the mobile terminal according to the set time, wherein the short message used for tracking and locating at least carries the identification of the cellular tower interacting with the built-in card and the information of the signal intensity, and proceed to step F;

in the preferred embodiment, the short message used for tracking and locating also carries the registration information of the current SIM card and the position tracking information, and so on, wherein the position tracking information is calculated out by the security system module according to the identification of the cellular tower interacting with the built-in card and the information of the current signal intensity;

step E, the mobile terminal enters into the idle state of the security system;

step F, the mobile terminal displays the startup picture to the user, and continues the normal power-on procedure.

From the above-mentioned two embodiments, it can be seen that the security system in the technical scheme of the present invention can work together with the operating system to monitor and operate the SIM card, in the meanwhile, the security system module has the authority to independently operate the standby battery and the built-in card, and the operating system does not directly connect with the built-in card and the standby battery, thus preventing the condition of the invalidation of the security system due to refreshing the operating system from occurring. Moreover, the security system in the technical scheme of the present invention does not use the functions such as the display screen, the key-press response, the signal indicator light, the audio input and output and so on, which expose that the security system module is running, thus the security system is good at cover-up to bring the advantages of security and saving electricity. Furthermore, the technical scheme of the present invention adopts a standby battery, that is, it implements double power supply mechanism, therefore, when the mobile terminal is illegally interrupted the main power supply, it can provide source power for the security system via the standby battery, thus effectively solving the problem that the security system is invalid due to the power supply is cut off such as removing the battery.

The above description are preferred embodiments of the present invention rather than intended to limit the present invention. For those skilled in the art, the present invention can have a variety of modification and variations. Any modification, variations and improvement made within the spirit and essence of the present invention should be comprised in the scope of the appending claims of the present invention.

INDUSTRIAL APPLICABILITY

The security system in the technical scheme of the present invention can work together with the operating system to monitor and operate the SIM card, in the meanwhile, the security system module has the authority to independently operate the standby battery and the built-in card, and the operating system does not directly connect with the built-in card and the standby battery, thus preventing the condition of the invalidation of the security system due to refreshing the operating system from occurring. Moreover, the security system in the technical scheme of the present invention does not use the functions such as the display screen, the key-press response, the signal indicator light, the audio input and output and so on, which expose that the security system module is running, thus the security system is good at cover-up to bring the advantages of security and saving electricity. Furthermore, the technical scheme of the present invention adopts a standby battery, that is, it implements double power supply mechanism, therefore, when the mobile terminal is illegally interrupted the main power supply, it can provide source power for the security system via the standby battery, thus effectively solving the problem that the security system is invalid due to the power supply is cut off such as removing the battery.

What is claimed is:

1. A mobile terminal capable for being tracked and located, comprising a built-in card and a security system module which are connected with each other, wherein, said security system module is configured to: when receiving an incoming call request or a short message sent from said built-in card, generate a short message used for tracking and locating, wherein the short message used for tracking and locating at least carries an identification of a cellular tower interacting with said built-in card and an information of current signal intensity, and send the short message used for tracking and locating to said built-in card; and said built-in card is configured to: send the received incoming call request or the received short message to said security system module, and periodically send the short message used for tracking and locating and generated by said security system module to a set security number.

2. The mobile terminal of claim 1, wherein,
said security system module is further configured to: judge whether a SIM card number of the mobile terminal is consistent with the set security number, and if the SIM card number is not consistent with the set security number, generate the short message used for tracking and locating and send to said built-in card.

3. The mobile terminal of claim 1, wherein,
said security system module is further configured to: periodically check whether the SIM card in said mobile terminal is in a normal state, and if the SIM card is not in the normal state, generate the short message used for tracking and locating and send to said built-in card.

4. The mobile terminal of claim 1, wherein,
said mobile terminal further comprises a standby battery connecting with said security system module, and said standby battery is configured to: supply said security system module with power when said mobile terminal is powered off, so that the security system module can work normally.

5. The mobile terminal of claim 1, wherein,
said security system module is implemented with a hardware circuit.

6. The mobile terminal of claim 1, wherein,
said short message used for tracking and locating further carries a registration information of a current subscriber identity module (SIM) card and a position tracking information.

7. The mobile terminal of claim 6, wherein,
said security system module is further configured to: judge whether a SIM card number of the mobile terminal is consistent with the set security number, and if the SIM card number is not consistent with the set security number, generate the short message used for tracking and locating and send to said built-in card.

8. The mobile terminal of claim 6, wherein,
said security system module is further configured to: periodically check whether the SIM card in said mobile terminal is in a normal state, and if the SIM card is not in the normal state, generate the short message used for tracking and locating and send to said built-in card.

9. The mobile terminal of claim 1, wherein,
said security system module is further configured to: judge and analyze whether the received short message sent from the built-in card carries an additional operation conforming to a set format, and perform the additional operation carried in the short message.

10. The mobile terminal of claim 9, wherein, said additional operations comprise one or more of:
modifying the security number, configuring a time interval for taking backa current tracking information, configuring information in the short message which is took back, whether the security system module needs to calculate the tracking information, and whether defaulted taking back all information.

11. The mobile terminal of claim 9, wherein,
said security system module is further configured to: judge whether a SIM card number of the mobile terminal is consistent with the set security number, and if the SIM card number is not consistent with the set security number, generate the short message used for tracking and locating and send to said built-in card.

12. The mobile terminal of claim 9, wherein,
said security system module is further configured to: periodically check whether the SIM card in said mobile terminal is in a normal state, and if the SIM card is not in the normal state, generate the short message used for tracking and locating and send to said built-in card.

13. The mobile terminal of claim 1, wherein,
said security system module is further configured to: automatically accept the incoming call request sent from said built-in card, prompt an opposite party by voice additional operations that can be selected, and perform the corresponding additional operation according to a selection of the opposite party.

14. The mobile terminal of claim 13, wherein, said additional operations comprise one or more of:
modifying the security number, configuring a time interval for taking back a current tracking information, configuring information in the short message which is took back, whether the security system module needs to calculate the tracking information, and whether defaulted taking back all information.

15. The mobile terminal of claim 13, wherein,
said security system module is further configured to: judge whether a SIM card number of the mobile terminal is consistent with the set security number, and if the SIM card number is not consistent with the set security number, generate the short message used for tracking and locating and send to said built-in card.

16. The mobile terminal of claim 13, wherein,
said security system module is further configured to: after prompting the opposite party by voice the additional operations that can be selected, if a dual tone multi frequency (DTMF) signal is detected, analyze the DTMF signal to acquire the additional operation selected by the opposite party.

17. The mobile terminal of claim 13, wherein,
said security system module is further configured to: periodically check whether the SIM card in said mobile terminal is in a normal state, and if the SIM card is not in the normal state, generate the short message used for tracking and locating and send to said built-in card.

18. The mobile terminal of claim 16, wherein,
said security system module is further configured to: judge whether a SIM card number of the mobile terminal is consistent with the set security number, and if the SIM card number is not consistent with the set security number, generate the short message used for tracking and locating and send to said built-in card.

19. The mobile terminal of claim 16, wherein, said additional operations comprise one or more of:
modifying the security number, configuring a time interval for taking back a current tracking information, configuring information in the short message which is took back, whether the security system module needs to calculate the tracking information, and whether defaulted taking back all information.

20. The mobile terminal of claim 16, wherein,
said security system module is further configured to: periodically check whether the SIM card in said mobile terminal is in a normal state, and if the SIM card is not in the normal state, generate the short message used for tracking and locating and send to said built-in card.

21. A mobile terminal capable of being tracked and located, comprising a built-in card and a security system module which are connected with each other, wherein, said built-in card is configured to: periodically send a short message generated by said security system module to a set security number; and said security system module is configured to: judge whether a subscriber identity module (SIM) card number of the mobile terminal is consistent with the set security number, and if the SIM card number is not consistent with the security number, generate the short message used for tracking and locating, wherein said short message used for tracking and locating at least carries an identification of a cellular tower interacting with said built-in card and an information of current signal intensity, and send the short message used for tracking and locating to said built-in card.

22. The mobile terminal of claim 21, wherein, said short message used for tracking and locating further carries a registration information of the current SIM card and a position tracking information.

23. A method for tracking and locating, comprising after a mobile terminal capable of being tracked and located starts up a security system, if the mobile terminal receives an incoming call request or a short message, the mobile terminal periodically sending a short message used for tracking and locating to a set security number, wherein the short message used for tracking and locating at least carries an identification of a cellular tower interacting with said mobile terminal and an information of current signal intensity.

24. The method of claim 23, wherein, said short message used for tracking and locating further carries a registration information of a current subscriber identity module (SIM) card and a position tracking information.

25. The method of claim 23, further comprising:

after the mobile terminal is powered off, starting up a solar energy battery to supply said security system with power.

26. The method of claim 23, wherein, the incoming call request or the short message received by the mobile terminal is related to a built-in card in the mobile terminal; and when said built-in card in the mobile terminal receives the incoming call request, the method further comprises: said mobile terminal automatically accepting the incoming call request, prompting an opposite party by voice additional operations that can be selected, and performing the corresponding additional operation according to a selection of the opposite party.

27. The method of claim 26, wherein, before performing the corresponding additional operation according to a selection of the opposite party, the method further comprises: if a dual tone multi frequency (DTMF) signal is detected, analyzing said DTMF signal to acquire the additional operation selected by the opposite party.

28. The method of claim 26, wherein, when the built-in card in said mobile terminal receives the short message, before performing the corresponding additional operation according to the selection of the opposite party, the method further comprises: said mobile terminal judging and analyzing whether the short message carries an additional operation conforming to a set format.

29. A method for tracking and locating, comprising, after a mobile terminal capable of being tracked and located starts up a security system, if the mobile terminal determines that a subscriber identity module (SIM) card number of the mobile terminal is not consistent with a set security number, the mobile terminal periodically sending a short message used for tracking and locating to said security number, wherein the short message used for tracking and locating at least carries an identification of a cellular tower interacting with said mobile terminal and an information of current signal intensity.

30. The method of claim 29, further comprising:

if the mobile terminal determines that the SIM card number of the mobile terminal is consistent with said security number, the mobile terminal periodically sending the short message used for tracking and locating to said security number when receiving an incoming call request or a short message; and said mobile terminal further periodically checking whether an SIM card in said mobile terminal is in a normal state, and if the SIM card is not in the normal state, said mobile terminal periodically sending the short message used for tracking and locating to said security number;

wherein said short message used for tracking and locating further carries a registration information of the current SIM card and a position tracking information.

* * * * *